(12) United States Patent
Jain et al.

(10) Patent No.: US 9,047,164 B2
(45) Date of Patent: Jun. 2, 2015

(54) CALCULATING DEFECT DENSITY BY FILE AND SOURCE MODULE

(75) Inventors: Sandeep Jain, Palo Alto, CA (US); David Knight, Belmont, CA (US)

(73) Assignee: OPSHUB, INC. CA (US)

( * ) Notice: Subject to any disclaimer, the term of this patent is extended or adjusted under 35 U.S.C. 154(b) by 1073 days.

(21) Appl. No.: 11/853,780

(22) Filed: Sep. 11, 2007

(65) Prior Publication Data

US 2008/0066050 A1    Mar. 13, 2008

Related U.S. Application Data (60) Provisional application No. 60/844,309, filed on Sep. 12, 2006.

(51) Int. Cl.
*G06F 9/44* (2006.01)
*G06F 11/36* (2006.01)

(52) U.S. Cl.
CPC .............. *G06F 8/71* (2013.01); *G06F 11/3616* (2013.01); *G06F 8/70* (2013.01); *G06F 11/3672* (2013.01)

(58) Field of Classification Search
None
See application file for complete search history.

(56) References Cited

U.S. PATENT DOCUMENTS

| | | | | |
|---|---|---|---|---|
| 3,633,312 | A * | 1/1972 | Yeager et al. | 49/503 |
| 5,649,200 | A * | 7/1997 | Leblang et al. | 717/122 |
| 5,860,011 | A * | 1/1999 | Kolawa et al. | 717/142 |
| 5,907,705 | A * | 5/1999 | Carter | 717/122 |
| 6,909,927 | B2 * | 6/2005 | Nguyen | 700/110 |
| 7,013,441 | B2 * | 3/2006 | Bickford et al. | 716/52 |
| 7,065,239 | B2 * | 6/2006 | Maayah et al. | 382/145 |
| 7,093,235 | B2 * | 8/2006 | Andrews et al. | 717/124 |
| 7,337,124 | B2 * | 2/2008 | Corral | 705/9 |
| 7,562,344 | B1 * | 7/2009 | Allen et al. | 717/113 |
| 7,599,819 | B2 * | 10/2009 | Lindley | 702/189 |
| 7,603,653 | B2 * | 10/2009 | Sundararajan et al. | 717/105 |
| 7,613,589 | B2 * | 11/2009 | Hosagrahara | 702/182 |
| 7,680,932 | B2 * | 3/2010 | Defaix et al. | 709/225 |
| 7,906,036 | B2 * | 3/2011 | Takami et al. | 252/62.63 |
| 8,423,960 | B2 * | 4/2013 | Farchi et al. | 717/124 |

(Continued)

FOREIGN PATENT DOCUMENTS

| | | |
|---|---|---|
| JP | 03-094331 | 4/1991 |
| JP | 05-216651 | 8/1993 |

(Continued)

OTHER PUBLICATIONS

Stephen H. Kan, "Metrics and Models in Software Wuality Engineering", 1995, Addison-Wesley, pp. 83-125.*

(Continued)

*Primary Examiner* — Xi D Chen
(74) *Attorney, Agent, or Firm* — Barry Choobin; Patent 360 LLC (57) ABSTRACT

Techniques are provided for tracking and analyzing defect density by source file or module. Defect density is the number of distinct defects which required changes to be made (to fix the defect) to a particular file or module in a given period of time. This metric is very useful for identifying the most critical areas of weakness of the system and hence the areas where additional investment/action may be taken. For example, this metric can be used to prioritize the area in which unit tests should be written, for which additional automated system tests should be written or which a project should be undertaken to re-write the error prone file or module to improve its quality and maintainability.

6 Claims, 5 Drawing Sheets

Bug Density by Module (all Priorities, as of May 30th, 2007)

| Module Name | 30 Days | 60 Days | 90 Days |
|---|---|---|---|
| moduleA | 1 | 1 | 3 |
| moduleB | 1 | 1 | 2 |

Bug Density by Module (all Priorities, as of May 30th, 2007)

| Module Name | 30 Days | 60 Days | 90 Days |
|---|---|---|---|
| moduleA/file1.c | 1 | 1 | 2 |
| moduleA/file3.c | 0 | 0 | 1 |
| moduleB/file2.c | 1 | 1 | 1 |
| moduleB/file4.c | 0 | 0 | 1 |

(56) References Cited

U.S. PATENT DOCUMENTS

| | | | | |
|---|---|---|---|---|
| 8,869,120 | B2* | 10/2014 | Huuck et al. | 717/120 |
| 2002/0059294 | A1 | 5/2002 | Bottarelli et al. | |
| 2003/0088810 | A1* | 5/2003 | Marshall | 714/38 |
| 2004/0117761 | A1* | 6/2004 | Andrews et al. | 717/101 |
| 2004/0133444 | A1* | 7/2004 | Defaix et al. | 705/1 |
| 2005/0223357 | A1* | 10/2005 | Banerjee et al. | 717/120 |
| 2006/0069659 | A1* | 3/2006 | Gatov et al. | 705/400 |
| 2008/0148225 | A1* | 6/2008 | Sarkar et al. | 717/107 |
| 2009/0217302 | A1* | 8/2009 | Grechanik et al. | 719/320 |
| 2009/0328002 | A1* | 12/2009 | Lin et al. | 717/120 |
| 2010/0180258 | A1* | 7/2010 | Takahashi | 717/124 |
| 2010/0251027 | A1* | 9/2010 | Yawalkar et al. | 714/38 |
| 2011/0022551 | A1* | 1/2011 | Dixon | 706/12 |
| 2012/0272220 | A1* | 10/2012 | Calcagno et al. | 717/125 |
| 2013/0074038 | A1* | 3/2013 | Fox et al. | 717/122 |
| 2013/0179863 | A1* | 7/2013 | Vangala et al. | 717/124 |
| 2014/0165045 | A1* | 6/2014 | Calcagno et al. | 717/125 |

FOREIGN PATENT DOCUMENTS

| | | |
|---|---|---|
| JP | 05-233238 | 9/1993 |
| JP | 2006-65521 | 3/2006 |

OTHER PUBLICATIONS

Nachiappan Nagappan, et al., "Mining Metrics to Predict Component Failures", May 2006, ACM, pp. 452-461.*

Walter F. Tichy, "RCS—A System for Version Control", 1985, Software—Practice & Experience, pp. 1-19.*

Daskalantonakis, "A Practical View of Software Measurement and Implementation Experiences Within Motorola", IEEE Transactions on software engineering, vol. 18, No. 11, Nov. 1992; [retrieved on Apr. 23, 2011]; Retrieved from internet <URL:http://ieeexplore.ieee.org/xpls/abs_all.jsp?arnumber=177369&tag=1>; pp. 998-1010.*

Cai, "Software Defect and Operational Profile Modeling", 1998, Kluwer Academic Publishers; [retrieved on Oct. 31, 2011]; Retrieved from Internet <URL:http://www.springerlink.com/content/v77072p3h2pm2833/fulltext.pdf>; pp. 30-68.*

Gaffney, "Estimating the Number of Faults in Code", 1984, IEEE; [retrieved on Nov. 1, 2011]; Retrieved from Internet <URL:http://ieeexplore.ieee.org/stamp/stamp.jsp?tp=&arnumber=5010260>; pp. 459-464.*

Various authors, Supplemental Proceedings of DSN 2006; [retrieved on Oct. 31, 2011]; Retrieved from Internet <URL:http://citeseerx.ist.psu.edu/viewdoc/download?doi=10.1.1.112.4202&rep=rep1&type=pdf>; pp. 1-233.*

Zhu, Faller, "Defect-Density Assessment in Evolutionary Product Development", 2013 IEEE; [retrieved on Jan. 25, 2015]; Retrieved from Internet <URL: http://ieeexplore.ieee.org/stamp/stamp.jsp?tp=&arnumber=6253198>;pp. 81-87.*

Sajnani, et al., "A comparative Study of Bug Pattern in Java Cloned and Non-cloned Code"; 2014 IEEE;[retrieved on Jan. 25, 2015]; Retrieved from Internet <URL: http://ieeexplore.ieee.org/stamp/stamp.jsp?tp=&arnumber=6975632>;pp. 21-30.*

Jiang, et al., "Misclassificaton cost-sensitive fault prediction models"; 2009 ACM;[retrieved on Jan. 25, 2015]; Retrieved from Internet <URL: http://dl.acm.org/citation.cfm?id=1540438.1540466>;pp. 1-10.*

Lyu, "Software Reliability Engineering a Roadmap"; 2007 IEEE;[retrieved on Jan. 25, 2015]; Retrieved from Internet <URL: http://dl.acm.org/citation.cfm?id=1253532.1254716>;pp. 1-18.*

"Notification of Transmittal of the International Search Report and the Written Opinion of the International Searching Authority, or the Declaration" received in corresponding PCT case International application No. PCT/JUS2007/078293 dated Feb. 19, 2008 (12 pages).

European Search Report received in International Application No. 07842349.8 dated Jan. 7, 2010 (6 pages).

Current claims of International Application No. 07842349.8 dated Jun. 5, 2009 (2 pages).

* cited by examiner

Checkin Data

| Check-in Time | File Name | Canonical Name | Project | Component | User |
|---|---|---|---|---|---|
| May 21, 2007 18:20:32 | /depot/p1/moduleA/file1.c | /moduleA/file1.c | p1 | moduleA | dduck |
| May 21, 2007 18:20:32 | /depot/p1/moduleB/file2.c | /moduleB/file2.c | p1 | moduleB | dduck |
| May 20, 2007 17:20:15 | /depot/p1/moduleB/file2.c | /moduleB/file2.c | p1 | moduleB | mmouse |
| Mar 18, 2007 19:12:31 | /depot/p2/moduleA/file1.c | /moduleA/file3.c | p2 | moduleA | ggoofy |
| Mar 16, 2007 19:12:37 | /depot/p2/moduleB/file2.c | /moduleB/file4.c | p2 | moduleB | mmouse |
| Mar 15, 2007 19:12:31 | /depot/p2/moduleA/file1.c | /moduleA/file1.c | p2 | moduleA | dduck |

Bug Database Data (subset)

| Bug ID | Priority | Reporter | Assigned To | Short Description |
|---|---|---|---|---|
| 10001 | P1 | ddave | dduck | Mickey Needs help |
| 10002 | P2 | mmouse | mmouse | Fix Disneyland Sign |
| 10003 | P1 | pluto | dduck | make new friends |

FIG. 3

Bug Density by Module (all Priorities, as of May 30th, 2007)

| Module Name | 30 Days | 60 Days | 90 Days |
|---|---|---|---|
| moduleA | 1 | 1 | 3 |
| moduleB | 1 | 1 | 2 |

Bug Density by Module (all Priorities, as of May 30th, 2007)

| Module Name | 30 Days | 60 Days | 90 Days |
|---|---|---|---|
| moduleA/file1.c | 1 | 1 | 2 |
| moduleA/file3.c | 0 | 0 | 1 |
| moduleB/file2.c | 1 | 1 | 1 |
| moduleB/file4.c | 0 | 0 | 1 |

CALCULATING DEFECT DENSITY BY FILE AND SOURCE MODULE

PRIORITY CLAIM

This application claims the benefit of the provisional patent application Ser. No. 60/844,309 filed Sep. 12, 2006, the contents of which are incorporated herein by this reference.

FIELD OF THE INVENTION

The present invention relates to the analysis of defect rates in software development and related disciplines such as Computer Aided Design (CAD).

BACKGROUND

In software development and related fields, defects are tracked and analyzed in "bug tracking" or "task tracking" systems. When defects are entered into the system they are generally tracked and analyzed on such variables as, product version, platform, defect severity, and date entered. When defects are fixed, the defect tracking system is updated to change the status of the defect to resolved or closed. A short explanation or comment about the cause of the defect and the changes made to fix it are typically captured.

These defect tracking systems are independent of the source control system which contains the actual work product (such as software code source code, design documents etc.) in question. As a result there is no correlation between the actual changes made to fix the defect and the information recorded in the defect tracking system. This lack of correlation between the defect tracked in the defect tracking system and the physical changes made to the source work product in the source control system presents many problems including:

- No ability to identify which source files or modules are most prone to defects.
- No ability to track whether the quality of a given source file or module is improving or declining over time.
- No ability to prioritize quality assurance resources to test the most error prone files and modules.

Organizations spend billions of dollars per year on quality assurance to find defects before product shipment. In addition, the economic cost of defects which are not found and cause later product failures is also very significant. So the inability of organizations to identify which source modules are most defect prone is a big issue with very real economic impacts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for tracking and analyzing defect density by source file or module. Defect density is the number of distinct defects which required changes to be made (to fix the defect) to a particular file or module in a given period of time. This metric is very useful for identifying the most critical areas of weakness of the system and hence the areas where additional investment/action may be taken. For example, this metric can be used to prioritize the area in which unit tests should be written, for which additional automated system tests should be written, or which project should be undertaken to re-write the error prone file or module to improve its quality and maintainability.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for tracking and analyzing defect density by source file or module. Defect density is the number of distinct defects which required changes to be made (to fix the defect) to a particular file or module in a given period of time. In one embodiment, when a developer completes and "checks-in" the changes required to fix a defect into the source control system, the relevant defect tracking-ID from the defect tracking system is captured.

This defect ID is validated against the defect tracking system to ensure it corresponds to a valid, open defect. If the defect ID is valid the check-in is allowed to proceed, if not it is rejected.

For all completed check-ins (changes) the defect ID, and a list of all files/modules changed are captured and stored for later analysis.

Simply having a list of all files changed and defect IDs alone is not enough to provide a meaningful measure of defect density by file or module. The reason for this is that multiple versions of the same file typically exist in different versions of the same work product. These different versions are typically represented as different "branches" of the source control "tree". To solve this issue, all of the various physical version of the same file/module must be mapped back to a single logical entity, the canonical name of the file and corresponding module/component.

Having captured the above data, reports can now be generated which count the # of defects per source file/module over time. This defect density report can then be analyzed to determine which files/modules are most defects prone and whether the defect rate for a given file/module is increasing or decreasing over time. This data is very useful and can be used as a basis for quality assurance test prioritization and other corrective actions.

System Overview

Figure 1:
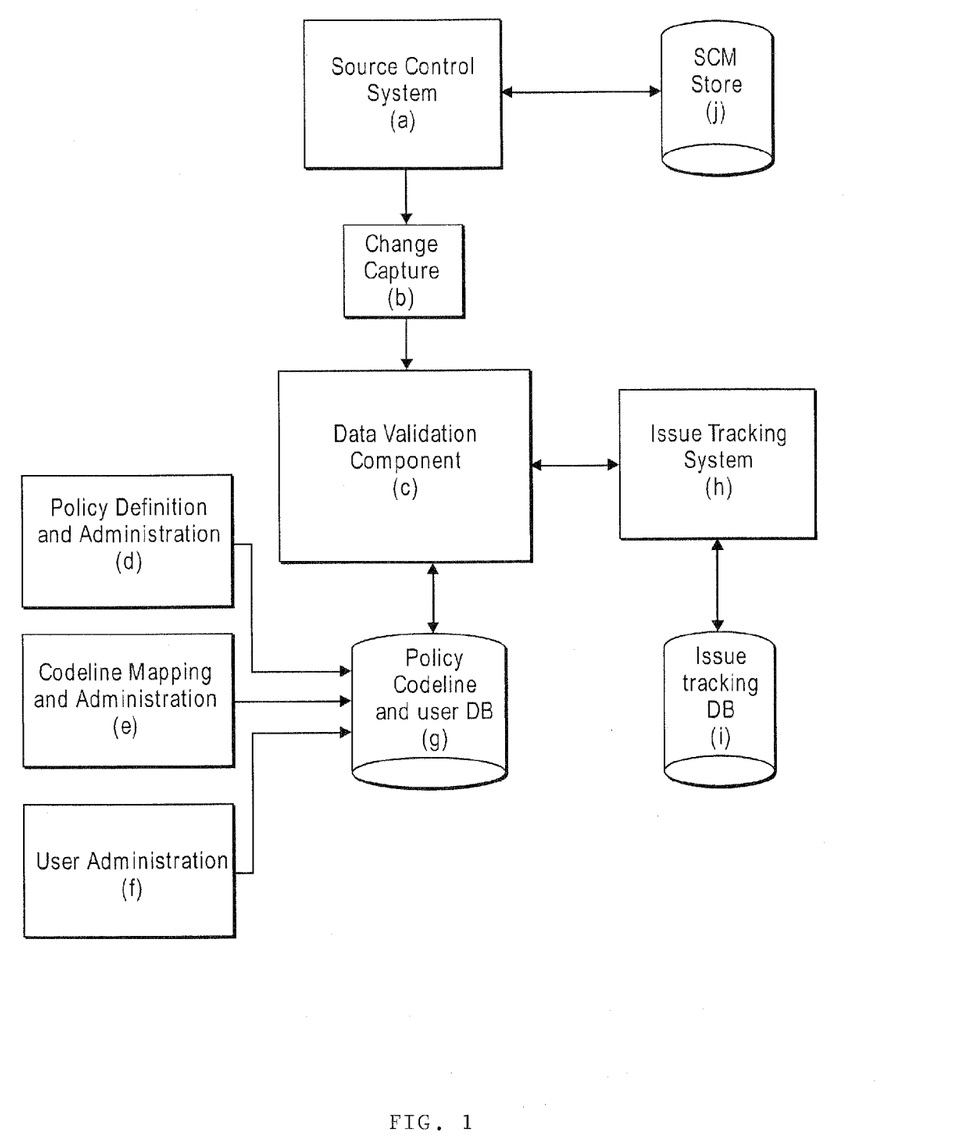
FIG. 1 is a block diagram of a system configured to track and analyze defect density by source file, according to an embodiment of the invention.

FIG. 1 illustrates the major components of a system configured to perform the techniques described herein, and the relationship between those components and existing systems. The techniques described herein are designed to work with existing Source Control Management (SCM) systems (FIGS. 1 (a) and (j)). These systems are sometimes also referred to as software change management systems. Popular examples of SCM systems include but are not limited to CVS, PVCS, and Perforce. SCM systems are designed to capture, store and manage access and provide version control for software source files, designs and similar files. SCM systems have basic facilities to allow or deny changes, the invention extends these facilities to enforce sophisticated change policies based on codeline state.

The Change Capture Component (FIG. 1 (b)) intercepts proposed changes in the SCM system, captures any required information related to the proposed change (issue ID for example), "calls out" to the Data Validation Component (FIG. 1 (c)) component passing along all relevant details of the proposed change and receives the response from the Data Validation Component (accept, reject etc.). Depending on the response, the Change Capture component either allows the proposed change to proceed into the SCM system or rejects it and provides the user with an appropriate error message.

The Data Validation component (FIG. 1 (c)) validates that the task ID is valid and that the hours entered are within an acceptable range. It takes input from the Change Capture components, retrieves the valid data ranges and other information from the Policy DB (FIG. 1(g)). It can also call out to the Issue Tracking System to validate Issue IDs or retrieve relevant information.

The Policy Administration Component (FIGS. 1 (d), (e) and (f)) allows the administrator to define and manage the Code Line Mapping and manage valid data ranges and userIDs for authorized users. The information defined in this component is stored in the Policy DB (FIG. 1(g)). The Policy DB (FIG. 1 (g)) stores the codeline mapping and related information along with the names and userIDs of authorized users. This DB would typically be implemented using an industry standard relational database management system (RDBMS), although other implementations would be acceptable.

As with SCM systems, the invention is designed to work with existing Issue Tracking Systems and Issue Tracking Databases (FIGS. 1 (h) and (i)). These systems are used to record and track both tasks that need to be completed for a project as well as open bugs and issues. Common examples of these systems include, but need not be limited to Bugzilla and Team Track.

Mapping Physical Source Control System Codeline to Projects

To enforce track bug density by module, one must be able to map changes to individual files in individual source control branches to all the other versions of those same files and modules in other source control branches.

For example, suppose there are two active projects, one to release an application called "Sample App1 V3" which is made up of three modules (moduleA, moduleB, moduleC) and another called "Sample App2 V6.1" consisting of four modules (moduleD, moduleE, moduleF and moduleG). Sample App1 V3 is in the "development" phase and Sample App2 V6.1 is in the "Code Freeze" phase. Team 1 is assigned to Sample App1 V3 and Team 2 is assigned to Sample App2 V6.1. The source SCM system is organized by module, with each module having its own path and each project having its own branch. The table below shows the minimal data that would be captured for this example:

| Product Name | Sample App1 | Product Name | Sample App 1 |
| Project Name | Sample App1 V3 | Project Name | Sample App 1 V4 |
| BranchPathPrefix | /depot/p1 | BranchPathPrefix | /depot/p2 |
| Project Content and relative path | | Project Content and relative path | |
| ModuleA | /moduleA | Module1 | /moduleA |
| ModuleB | /moduleB | Module2 | /moduleB |
| ModuleC | /moduleC | Module3 | /moduleC |

With the above information whenever a change is made to any file, the system is able to determine what module that file is associated with regardless of which branch or release is being updated.

Capturing, Validating and Files Changed by Task

Figure 2:
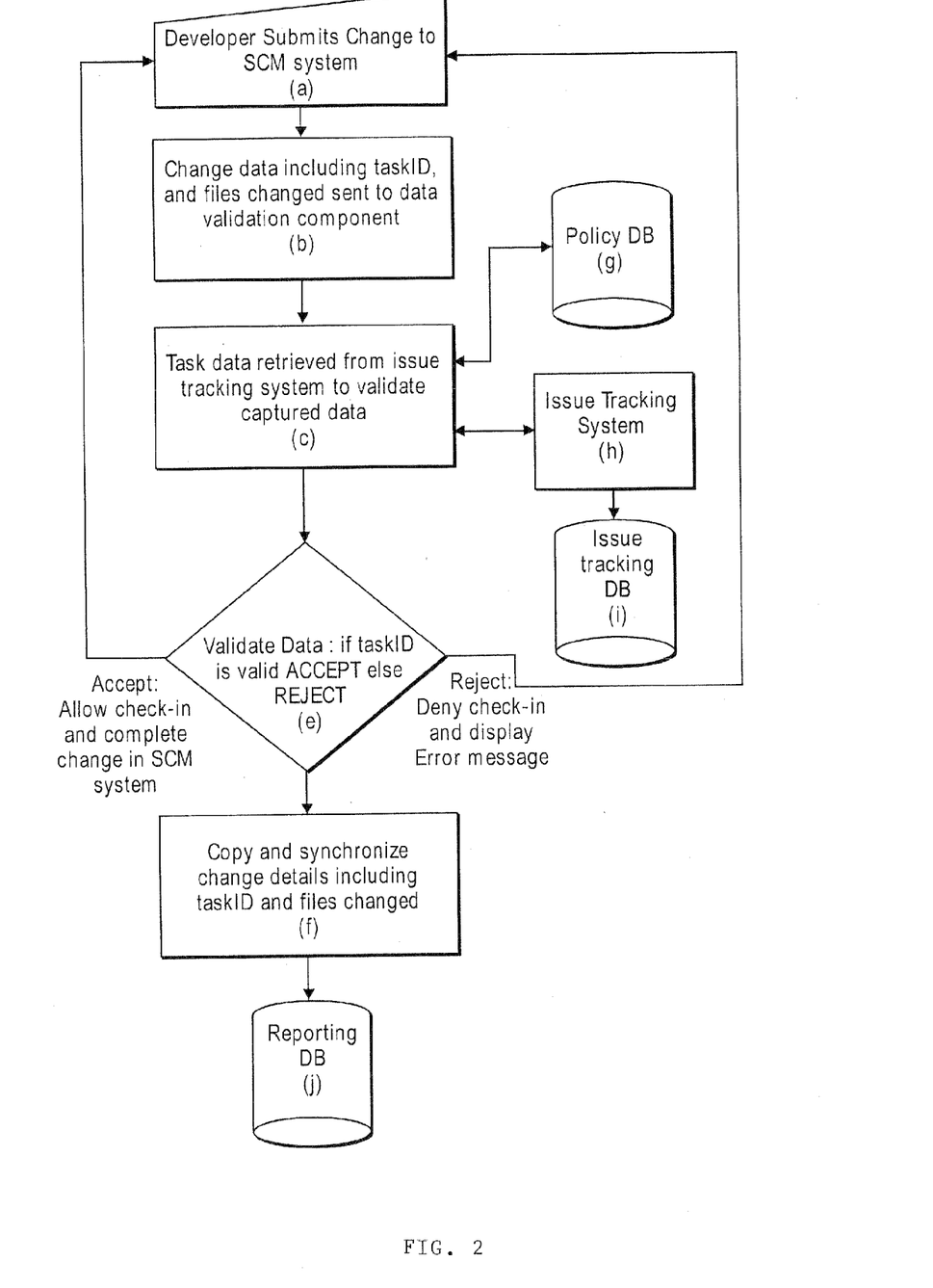
FIG. 2 is a block diagram of process flow for capturing, validating and recording the files changed by task, according to an embodiment of the invention.

FIG. 2 outlines the process flow for capturing, validating and recording the files changed by task using the components described above. The process begins with the developer submitting the proposed change(s) to the source control system (FIG. 2, (a)).

When the change is submitted the variables necessary (user, taskID and files modified) to evaluate the requested change are captured as part of this process. The data captured is outlined below:

Since any user submitting a change would have already been authenticated by the SCM system, the userID of the requesting user would be automatically captured by the system The taskID associated with the proposed change The files changed as part of this check-in Any other variable which might be helpful in subsequent analysis of the data such as root cause or effort level.

Once the developer has submitted the change, the program sends the information captured to the Data Validation Component (FIG. 2, (b)). Note, the changes are not "committed" to the source control system at this time, but are held in an in-process state.

When the Data Validation Component receives the proposed changes (FIG. 2, (c)), the program retrieves the information necessary and validates that the taskID is valid by querying the issue tracking system. If either the taskID is invalid the change is rejected, with the SCM system being notified to reject the change and the end-user receiving an appropriate error message. If the data values are valid, the SCM system is notified to accept the change and "commit" it to the system.

Data Synchronization

Once the change has been successfully committed to the SCM system, the committed data must be recorded for reporting purposes. This extra step is required since while the Data Validation Component has notified the SCM system that it "can" accept the change, the SCM system is not required to do so and may still reject the change for some other reason (the file is locked by another user for example). To address this issue, once the change has been committed to the SCM system a background job creates a copy of the check-in data in and moves it into a separate reporting database. This is typically a relational database management system (RDBMS), but other implementation would be acceptable.

Calculating Bug Density by File or Module

Figure 3:
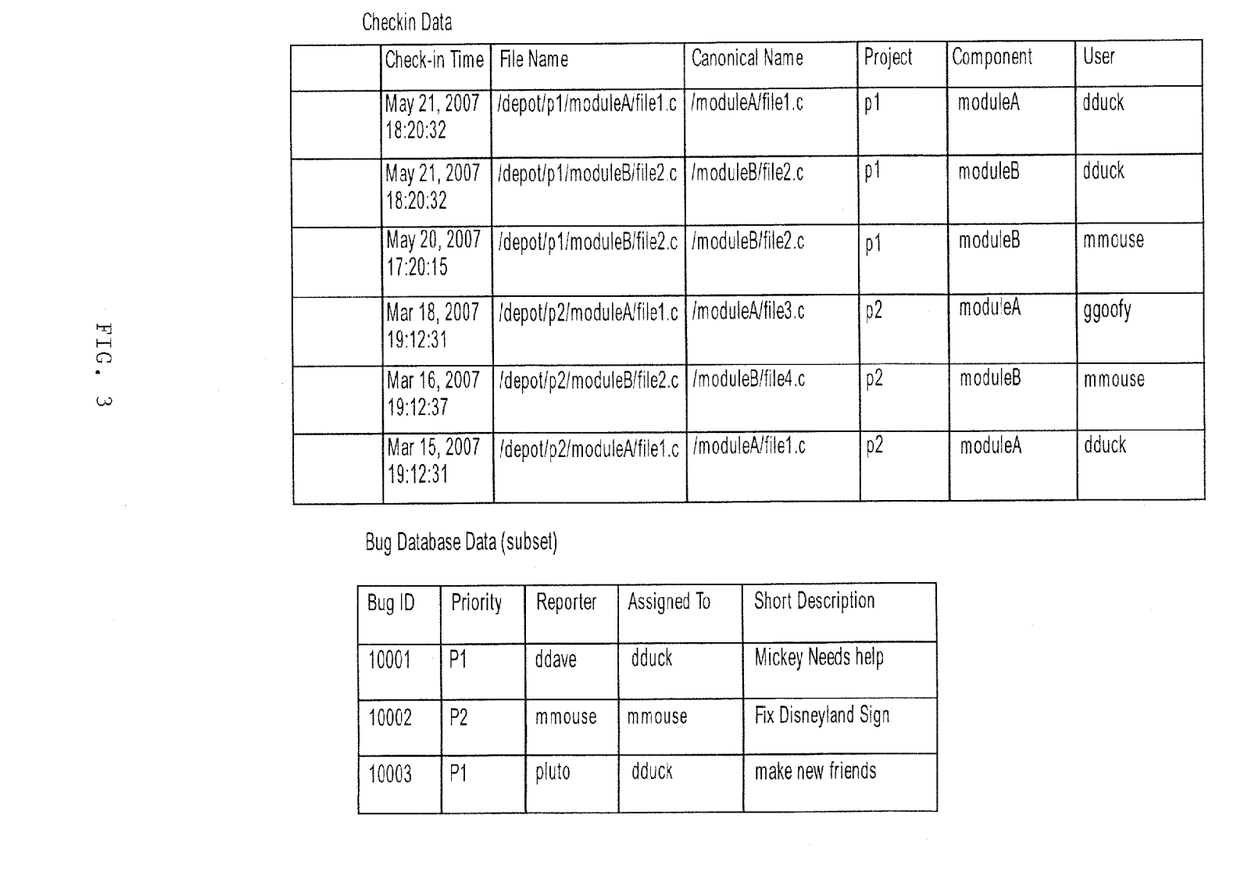
FIG. 3 illustrates a simple example of the raw data.
Figure 4:
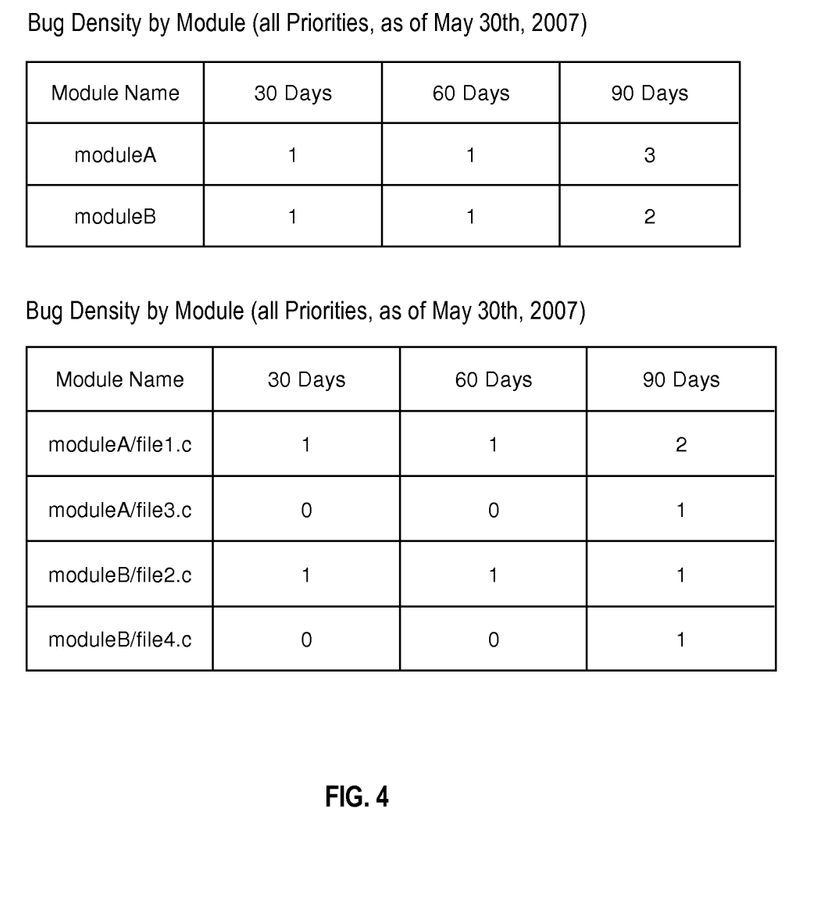
FIG. 4 illustrates a possible report output format, according to an embodiment of the invention.

Once the data has been captured as described above, the following information is available for reporting:

All changes are now associated with a valid taskID
For each taskID the files changed in working on that task/bug
A mapping of files to modules across one or more releases
The date on which each task/bug was fixed With the above information stored in a standard database the number of bugs per file or module can be calculated over a given period of time. This report can be generated in a variety of ways depending on the kind of data store and reporting tool being used. Further the data can be filtered by various criteria to get reports of bug density on filtered data. One such example may be a report of Bug Density for P1 priority bugs. FIG. 3 provides a simple example of the raw data and FIG. 4 one possible report output format.

The system can also generate all of these reports by filtering on various dimensions. e.g. One may be interested in finding bug density for just the critical bugs (P1's) as that will indicate the sources of critical issues. Such a report will be as follows:

| Bug Density by Module (P1's only) | | | |
|---|---|---|---|
| Module Name | 30 Days | 60Days | 90 Days |
| moduleA | 1 | 1 | 3 |
| moduleB | 1 | 1 | 2 |

| Bug Density by file (P1's only) | | | |
|---|---|---|---|
| Module Name | 30 Days | 60Days | 90 Days |
| moduleA/file1.c | 1 | 1 | 2 |
| moduleA/file3.c | 0 | 0 | 1 |
| moduleB/file2.c | 2 | 2 | 2 |
| moduleB/file4.c | 0 | 0 | 1 |

The system can also get various other views by filtering appropriately.

Hardware Overview

Figure 5:
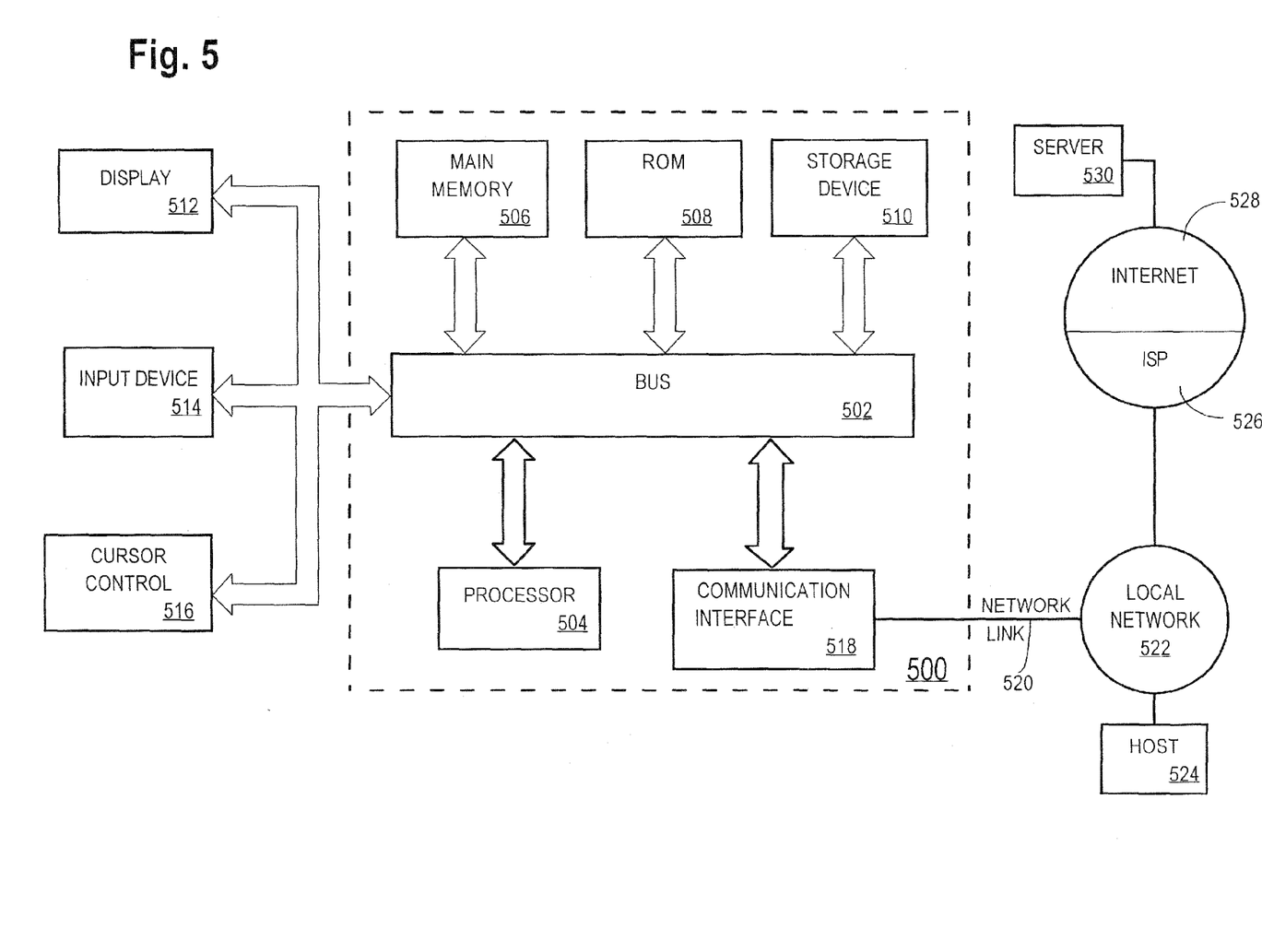
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for tracking and analyzing a defect density by a source file or module, the method comprises:

generating a defect density value for each unit of a plurality of units that contain code for a computer program, wherein the defect density value indicates a number of distinct defects in said unit in which required changes are to be made to fix a defect in a given period of time, and wherein said plurality of units are a plurality of modules of said computer program and wherein generating a defect density value for each unit of a plurality of units that contain code for a computer program includes generating a separate defect density value for each module of said plurality of modules, and wherein a defect density value for each unit of a plurality of units that contain code for a computer program is generated for identifying critical areas of weakness in plurality of modules for investing additional action and to rewrite an error prone module; and generating the defect density value for each logical entity of a plurality of logical entities that contain code for a computer program, wherein the defect density value indicates how many distinct defects in said logical entity required changes to be made, and wherein generating the defect density value for each logical entity involves mathematically adding the defect density values of each unit of the plurality of units that is a version of the logical entity, and wherein at least one logical entity of the plurality of logical entities has a plurality of units that are versions of the at least one logical entity, and wherein a plurality of versions of the plurality of files are mapped to the at least one logical entity, and wherein said plurality of units are a plurality of files that contain code for said computer program, and wherein generating a defect density value for each unit of a plurality of units that contain code for a computer program includes generating a defect density value for each file of said plurality of files;

determining a single logical entity to which the file corresponds to provide a measure of the defect density by file by using a canonical name of a file of the plurality of files, and wherein a same file existing in a plurality of locations in a single project has different canonical names, and wherein the same file existing in a plurality of locations in a same project due to branching has same canonical name, and wherein the canonical name is mapped to a file based on a check-in data, file name, project, module and user;

generating a report that indicates, for each logical entity, a separate value represents mathematically adding the defect density values of each unit of the plurality of units that is a version of the logical entity, and wherein the report is generated in a plurality of ways depending on a type of data store and reporting tool used, and wherein the plurality of reports includes a report of bug density for priority bugs and a report of bug density for critical bugs, and wherein the bug density with respect to module and the bug density with respect to each file in each module are computed and reported;

associating each distinct defect with a level of criticality and an assignee, and wherein the value, indicates only those distinct defects associated with a particular level of criticality;

associating each distinct defect with a period of time in which the corresponding unit required changes to be made, and wherein the value included in the report includes an indication of the detect density value of each logical entity for the period of time; and wherein the defect density per file or module is calculated based on the assignee, criticality, changes associated with a valid task ID, the files changed for each task ID, mapping of the files to the modules across one or more releases and a date of bug-fixing;

wherein the method is performed by one or more computing devices.

2. The method of claim 1, further comprises generating a defect density value for each logical entity of the plurality of logical entities for each time interval of a plurality of time intervals.

3. The method of claim 2 further comprises using the defect density values, generated for a given logical entity over said plurality of time intervals, to determine whether the defect rate for said given logical entity is increasing or decreasing over time.

4. A non-transitory computer readable storage medium storing instructions, the instructions including instructions for tracking and analyzing a defect density by a source file or module which, when executed by one or more processors, cause the one or more processors to perform the steps of:

generating a defect density value for each unit of a plurality of units that contain code for a computer program, wherein the defect density value indicates how many a number of distinct defects in said unit required changes to be made;

wherein said plurality of units are a plurality of modules of said computer program, and wherein generating a detect density value for each unit of a plurality of units that contain code, for a computer program is generated for identifying critical areas of weakness in plurality of modules for investing additional action and to re-write an error prone module; and generating the detect density value for each unit of a plurality of logical entity of a plurality of logical entities that contain code for a computer program, wherein the defect density value indicates how many distinct defects in said logical entity required changes to be made, and wherein generating the defect density value for each logical entity involves mathematically adding the defect density values of each unit of the plurality of units that is a version of the logical entity, and wherein at least one logical entity of the plurality of logical entities has a plurality of units that are versions of the at least one logical entity, and wherein a plurality of versions of the plurality of files are mapped to the at least one logical entity, and wherein said plurality of units are a plurality of files that contain code for said computer program, and wherein generating a defect density value for a computer program includes generating a defect density value for each file of said plurality of files;

determining a single logical entity to which the file corresponds to provide a measure of the defect density by file by using a canonical name of a file of the plurality of files, and wherein a same file existing in a plurality of locations in a single project has different canonical names, and wherein the same file existing in a plurality of locations in a same project due to branching has same canonical name, and wherein the canonical name is mapped to a file based on a check-in data, file name, project, module and user;

generating a report that indicates, for each logical entity, a separate value that represents mathematically adding the detect density values of each unit of the plurality of units that is a version of the logical entity, and wherein the report is generated in a plurality of ways depending on a type of data store and reporting tool used, and wherein the plurality of reports includes a report of bug density for priority bugs and a report of bug density for critical bugs, and wherein the bug density with respect to module and the bug density with respect to each file in each module are computed and reported;

associating each distinct defect with a level of critically and an assignee, and wherein the value, included in the report, indicates only those distinct defects associated with a particular level of criticality;

associating each distinct defect with a period of time in which the corresponding unit required changes to be made, and wherein the value included in the report includes an indication of the defect density value of each logical entity for the period of time; and prioritizing writing of tests for said units based on detect density values generated for said units; and wherein the defect density per file or module is calculated based on assignee, criticality and changes associated with a valid task ID, the files changed for each task ID, mapping of the files to the modules across one or more releases and a date of bug-fixing.

5. The non transitory computer-readable storage medium of claim 4 further comprising instructions for generating a detect density value for each logical entity of the plurality of logical entities for each time interval of a plurality of time intervals.

6. The non-transitory computer-readable storage medium of claim 5 further comprising instructions for using the defect density values, generated for a given logical unit over said plurality of time intervals, to determine whether the defect rate for said given logical unit is increasing or decreasing over time.

* * * * *